Dec. 3, 1968 R. W. LUCKY 3,414,819

DIGITAL ADAPTIVE EQUALIZER SYSTEM

Filed Aug. 27, 1965

INVENTOR
R. W. LUCKY
BY J. P. Kearns
ATTORNEY

United States Patent Office 3,414,819

Patented Dec. 3, 1968

3,414,819

DIGITAL ADAPTIVE EQUALIZER SYSTEM

Robert W. Lucky, Red Bank, N.J., assignor to Bell Telephone Laboratories, Incorporated, New York, N.Y., a corporation of New York Filed Aug. 27, 1965, Ser. No. 483,129

13 Claims. (Cl. 325—42)

ABSTRACT OF THE DISCLOSURE

An adaptive transversal equalizer system for multilevel digital data in which attenuators connected to equally spaced taps therealong are incrementally adjusted according to a correlation of the polarity of each received data symbol with an error polarity component to minimize intersymbol interference. The error polarity component is obtained fom the difference between the actual level of each received signal sample and the normalized digital encoding level assigned thereto. For smoothing purposes correlation results are averaged in reversible digital counters and tap attenuators are adjusted only upon overflow of such counters.

This invention relates to the correction of the distorting effects of transmission channels of limited frequency bandwidth on digital data intelligence signals and in particular to the rapid and continuous automatic equalization of such distorting effects adaptive to changes in channel characteristics with time.

In the copending joint application of F. K. Becker, R. W. Lucky and E. Port, Ser. No. 396,836 filed Sept. 16, 1964, now Patent No. 3,292,110, issued Dec. 13, 1966, an automatic equalization system employing a transversal filter is disclosed. A transversal filter is a well-known time domain network comprising a plurally tapped delay line, an adjustable attenuator connected to each delay line tap, and a summing circuit for combining the attenuated outputs of all taps into a single coordinated signal. The adjustable attenuator described in the copending application includes a reversible electronic digital counter coupled to a resistive ladder network with a large number of discrete incremental steps. During a training period preliminary to message data transmission these attenuator-counters are brought to optimum settings in a step-by-step procedure while test pulses are transmitted through the channel. The settings established during the set-up period remain fixed throughout message data transmission. The set-up apparatus can then be disconnected from the equalization system for use on other calls.

Channel characteristics can and do change with time. In the course of a long message the change in channel characteristics can be significant. In another copending application entitled "Adaptive Equalizer for Digital Transmission Systems," Serial No. 460,794 filed June 2, 1965, now Patent No. 3,368,168, issued February 6, 1968. I have disclosed how the tap gains of a transversal filter can be continuously adjusted for optimum equalization during normal message data transmission. In the adaptive equalizer the channel impulse response samples necessary for the adjustment of the equalizer are estimated by correlating the analog output voltage of the equalizer with the actual digital data output of the reanalog and digital outputs constitute an error component for correlation with the digital data output. Successive correlation products are averaged over a period of time for each tap on the transversal equalizer and sliced to determine the direction of the incremental adjustment of the corresponding attenuator-counter. The adaptive equalization system remains on-line throughout a given call.

While the principle of adaptive equalization disclosed in the last cited application has proved to be sound, its practical implementation becomes exceedingly complex for any but bilevel digital data transmission systems. This is due to the fact that a subtractor circuit would be required between each pair of possible code levels to determine the error component in the case of multilevel encoding. Equalization systems, however, have their greatest value in multilevel transmission where each data symbol includes a plurality of permissible amplitude levels to encode a plurality of message bits per symbol, thereby achieving more rapid overall communication rates.

It is accordingly an object of this invention to improve on-line adaptive equalization systems utilizing transversal filters.

It is another object of this invention to digitalize completely adaptive equalization systems using transversal filters.

It is yet another object of this invention to render adaptive equalization systems utilizing transversal filters responsive to multilevel signal transmission.

According to this invention, the adaptive equalization system disclosed in my prior application is improved by digitalizing the comparison of the analog received signal with the recovered data to obtain the polarity only of the error signal and not its actual magnitude. Further improvement over the prior implementation is obtained by using the overflow of reversible counters in place of the statistical averaging of low-pass filters.

Further, according to this invention the summed analog output of the transversal filter is sampled at the symbol rate and applied to a multilevel slicing circuit. The slicer produces a plurality of parallel outputs expressing in the Gray reflected binary code the amplitude level of each sample. It has ben discovered that by taking one more slice than necessary to characterize the number of discrete transmitted levels for data recovery purposes the polarity of the error component is simply derived. The error component after a fixed delay to align it in time with stored samples of the transversal filter output is correlated by modulo-two addition with symbol polarity indications obtaied from the most significant digit at the first slicing level of the multilevel slicing circuit. The resultant modulo-two outputs are averaged according to their sense in reversible counters with fixed maximum number of counts. Upon an overflow in either direction from these counters the corresponding attenuator-counter in the transversal filter is incremented accordingly and the counter itself reset to a neutral count position.

A feature of this invention is that the all-digital implementation of error-determining, storage and averaging is accomplished with standard components.

Another feature of this invention is that the error determination is made from a simple modification of the multilivel slicing circuit already available in the data receiver for normal data recovery.

Further objects and features of this invention will become apparent from a study of the following detailed description and the drawing in which.

Figures 1, 2, 3:
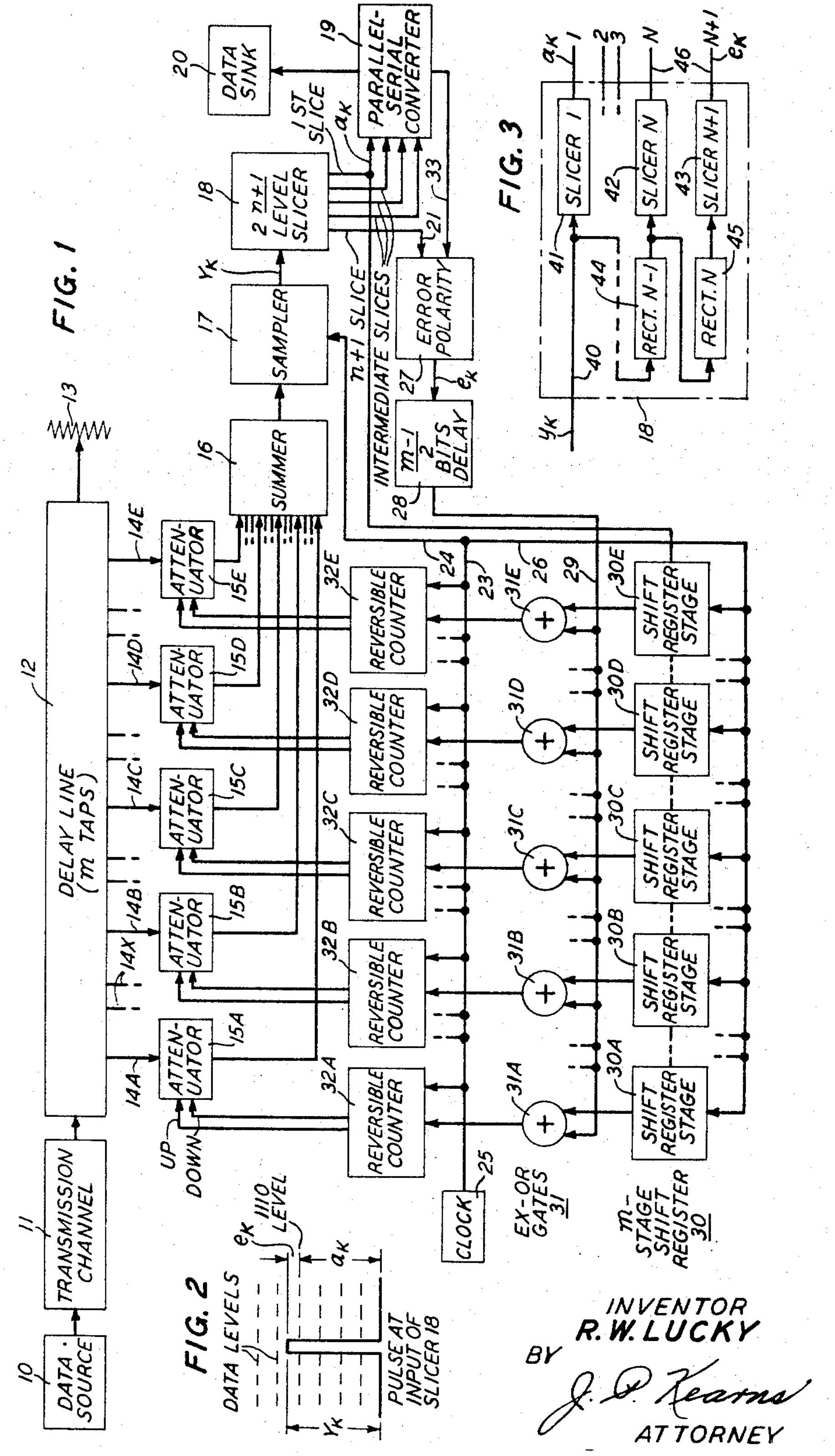
FIG. 1 is a block schematic diagram of the adaptive equalization system of this invention.
FIG. 2 is a pulse diagram of a typical sample of a multilevel signal of use in explaining the operation of this invention.
FIG. 3 is a block diagram of a representative multilevel slicer useful in the practice of this invention.

FIG. 1 is a diagrammatic of a high-speed multilevel digital data transmission system improved according to this invention by the inclusion of an on-line self-adjusting transversal filter equalizer. As disclosed in the copending patent application of F. K. Becker entitled "Suppressed Carrier Transmission System for Multilevel Amplitude Modulated Data Signals," Serial No. 459,659 filed May 28, 1965, it is possible to exceed the maximum theoretical binary data transmission rate over band-limited facilities by multilevel encoding. The symbol rate remains limited according to the well-known theories of H. Nyquist, but the effective serial data rate is increased above this limit by converting high-speed binary signals into multilevel form. The result is that each symbol represents a plurality of binary data bits. Decoding of multilevel signals requires a much greater protection against intersymbol interference than bilevel signals. Equalization provides this protection by compensating for the nonideal impulse response of practical transmission facilities.

Data source 10 in FIG. 1 generates a multilevel signal encoded in the Gray reflected binary form as explained in the last-mentioned Becker application by a serial-to-parallel conversion of a binary data train followed by a further binary-weighted digital-to-analog conversion into the Gray code. The Gray code is developed from the natural binary code in such a manner that a change between adjacent digits of the code is accomplished by a change of only one bit as is explained in United States Patent No. 2,632,058 issued to Gray on Mar. 17, 1953. For this reason such a code provides a significant margin against errors over the natural binary code. When levels in a multilevel signal are designated in the Gray code, binary singal recovery is greatly simplified. For a $2^n$—level natural binary encoding $(2^n-1)$ slicers are required for decoding while decoding the same number of levels in the Gray code require only $n$ slicers.

Transmission channel 11 is any band-limited channel, such as a voice-grade telephone line. The maximum practically attainable binary data rate on a telephone circuit is on the order of 2400 bits per second. With equalization this rate can be doubled. With multilevel encoding and equalization a further doubling is attainable.

In the transmission system of FIG. 1 equalization is accomplished in a transversal filter which comprises a delay line 12 terminated in a nonreflective impedance 13, a plurality of evenly spaced taps 14, a plurality of incrementally adjustable attenuator counters 15 and a summation circuit 16. This transversal filter, including particularly the incrementally adjustable attenuator-counters, is just as described in more detail in the cited Becker et al. application. Tap spacing is equal to the intersymbol interval for multilevel encoding.

The summed output of the equalizer is sampled in sampler 17 under the control of a symbol-rate clock 25 and delivered to an analog-to-digital converter represented here by multilevel slicer 18. Slicer 18 is the same type described in the Becker application in connection with block 42A of FIG. 12, implementing rectifier and slicing circuits of FIGS. 29 and 30 and the explanatory waveforms of FIG. 31.

Briefly, slicer 18, as reproduced in FIG. 3, comprises a plurality of full-wave rectifiers, such as those designated 44 and 45, in series with each other and the output of sampler 17 on input lead 40; and a plurality of zero-level slicing circuits, such as those designated 41, 42 and 43, one (41) in series with the output of sampler 17 and another (42, 43) in series with the output of each rectifier. Each rectifier effectively folds its input signal about the zero level and includes provision for centering the output on a new reference level. Each slicer yields the polarity of its input signal. Thus, the multistage slicer produces binary digits in the Gray code representing the quantized amplitude level of the output of sampler 17 on output leads, such as those designated 46.

FIG. 29 of the cited Becker application illustrates the circuit for a rectifier which performs the required folding and centering functions of blocks 44 and 45, in FIG. 3. FIG. 30 of the cited Becker application provides an embodiment of a slicing circuit which can be advantageously employed for performing the function of blocks 41 through 43 in FIG. 3.

The use of the Gray code in designating the levels of a multilevel data signal facilitates decoding where half the levels are positive and the other half are negative. The levels are numbered in increasing order from the most negative to most positive. A first slicing operation determines the most significant digit, which then designates symbol polarity. This is indicated in FIG. 3 as digit 1. Full-wave rectification folds the positive half onto the negative half and centers it with respect to the maximum possible signal excursion. A second slicing operation determines the next most significant digit 2. Further folding, centering and slicing determine the remaining Gray code digits (3 through N) of decreasing significance. In the example system sixteen encoded levels are used. This number of levels is encoded as a four-digit whole number. Each digit is represented by a "1" or "0" bit as in the natural binary code, but with different significance.

In the data transmission system depicted here the several bits in each Gray coded number appear on separate leads, such as 46 in FIG. 3, and are delivered to parallel-to-serial converter 19. Converter 19 emits a serial binary data train for utilization by data sink 20 in conventional fashion.

The problem here as in my cited prior application for an adaptive equalizer is to determine the direction of the error between the ideal impulse response and the actual impulse response of the transmission channel. Working only with the message data and in the presence of noise, estimates only of this error can be obtained from a given sample. However, averaging over a plurality of samples yields a statistically reliable direction indication for the errors. The fundamental technique of the digital adaptive equalizer is to estimate the polarities of impulse response samples from the equalizer by performing a digital correlation of symbol polarities and the polarities of error voltages at sampling times.

For purposes of explanation consider the typical analog sample at the input of slicer 18 shown in FIG. 2. A sampled pulse of amplitude $y_k$ is shown on a background of horizontal parallel broken lines representing some of the permissible data levels used for signal encoding. The example pulse is positive, but negative pulses are equally likely. In the absence of intersymbol interference or noise the amplitude $y_k$ would coincide with one of the permissible data levels. Here, however, the nearest permissible level $a_k$ is below $y_k$. In a sixteen-level code each level is designated by a four-bit digit such as 1110 indicated in the figure for the level $a_k$. These four bits are delivered to converter 19. Analog level $y_k$ exceeds data level $a_k$ by a positive amount $e_k$, which is the apparent error component.

There are two significant features about this sample pulse that can be represented digitally and stored for correlation purposes. The pulse itself is positive and is determined by the most significant digit in the four-digit Gray code for level $a_k$. The error voltage $e_k$ is positive, i.e., the algebraic difference between $y_k$ and $a_k$ is positive.

The polarity of the error voltage $e_k$ is obtained by the expedient, where the signal levels are encoded in the Gray form, of adding an additional stage of folding (rectifier N in FIG. 3) and slicing (slicer $N+1$ in FIG. 3) to the standard slicer 18, which supplied the output of the prior stages to converter 19 for message detection. The extra slicer stage $(N+1)$ folds about the detected level $a_k$ and its output indicates whether the actual received voltage $y_k$ is greater or lesser than the detected level $a_k$.

Because the polarity of the error component $e_k$ is taken as the algebraic difference between $y_k$ and $a_k$ and is therefore positive or negative with reference to the initial zero slicing level and not with reference to whether $y_k$ is greater or less than $a_k$ in the absolute sense, it is necessary to take into account the number of times the signal was folded to arrive at the error component. Specifically, if the original signal was folded an even number of times, the difference between $y_k$ and $a_k$ is positive. If the original signal was folded an odd number of times, the difference is negative.

This information can be obtained in a straight-forward manner by counting the number of "1's" in the mutibit digit designating the detected level $a_k$. A modulo-two summation (remainder after ordinary summation and division by two) of these bits accomplishes this result. If this summation is positive then the extra slice is negative and the true polarity of $e_k$ is the complement of the apparent polarity. In the exemplary level $a_k=1110$ there is an odd number of "1's"; therefore, the polarity of error component $e_k$ is positive. Lead 33 from converter 19 to error polarity block 27 supplies an indication of the oddness or evenness, i.e., parity, of the encoding digit. Block 27 may be an EXCLUSIVE-OR gate having the extra slice bit over lead 21 as one input and the parity bit over lead 33 as the other input. Its output is then the true polarity of the error component $e_k$.

Error polarity bits in the output of block 27 are now delayed by $$\frac{m-1}{2}$$

bits in block 28 to make it possible to estimate impulse response polarities over the full range required by a transversal filter having $m$ taps ($m$ odd) on its delay line. Delay block 28 is advantageously an $$\left(\frac{m-1}{2}\right)$$

stage shift register, since the error polarity bits are in binary form. In the illustrative embodiment a thirteen-tap delay line 12 is indicated. The value of $$\frac{m-1}{2}$$

is therefore 6.

Symbol polarity bits from slicer 18 on lead 22 are passed down a multistage shift register 30, of which five stages 30A through 30E are shown in full. There is actually one stage for each tap on delay line 12 of the transversal filter. Since delay line 12 has $m$ taps, shift register 30 has $m$ stages. The fixed $$\left(\frac{m-1}{2}\right)$$

bit delay of block 28 places the error polarity bit coincident in time with the arrival of the symbol polarity bit at the center stage 30C of the shift register. Stage 30C corresponds to the center or reference tap 14C on delay line 12, and may be considered to contain the present symbol polarity. Stages 30A and 30B to the left of center stage 30C therefore effectively contain past symbol polarity bits. Correspondingly, right-hand stages 30D and 30E effectively contain succeeding or future symbol polarity bits. Thus, a full range of symbol polarities is made available for correlation with error polarity information.

The correlation of error polarity with symbol polarity for the pupose of estimating impulse response polarities is accomplished in EXCLUSIVE-OR gates 31. EXCLUSIVE-OR gates, such as those designated by circles 31A through 31E, are provided to correspond with taps 14A through 14E on delay line 12 and shift register stages 30A through 30E. An EXCLUSIVE-OR gate for the purposes of this specification may be considered to provide a positive output if both of its inputs match and a negative output, otherwise. Thus, its output is an indication of the oddness or evenness of its inputs. Examples of diode EXCLUSIVE-OR gates are found in Pulse and Digital Circuits by Millman and Taub (McGraw-Hill Book Company, New York 1956) in FIGS. 13–25 on page 411. One input of each gate 31 receives the error polarity bit on lead 29. The other input is supplied with a symbol polarity bit from the corresponding stage of shift register 30. The outputs of the respective gates 31 are therefore a measure of the impulse response polarities at the respective taps of delay line 12.

Any given error polarity estimate $e_k$ is unreliable because of the presence of noise in the transmission facility and the finite distance between slicing levels in a multilevel signal. Therefore, it is necessary to avreage the correlated outputs from gates 31 over a period of time before making any adjustments in the attenuator-counters 15 of the transversal filter. The averaging medium chosen for this illustrative embodiment is the reversible counter.

Corresponding to each gate 31 is a digital reversible counter 32. Each counter counts forward and backward from zero and provides an output whenever the maximum counts is reached in either direction. At the same time the counter is reset to the zero neutral state. An overflow in the positive direction indicates a subsisting positive error at that delay line tap and an output is delivered to the corresponding attenuator-counter directing a downward incremental change. An underflow in the negative direction similarly directs an upward change in the attenuator. Randomly varying error polarities will not produce either underflow or overflow, and no corrections will be applied to the attenuators. The reversible counters can advantageously be of the same type employed in the attenuator-counters described in the aforesaid Becker et al. patent application. Additional provision is made to monitor the occurrence of maximum counts and to cause resetting to the midcount condition.

Aside from ease of implementation, the reversible counter has an advantage as an averaging medium over the low-pass filter and periodically actuated binary slicer in my previous adaptive equalizer in that the attainment of either overflow condition is independent of time. Its outputs direct an incrementing of an attenuator promptly when errors are actually occurring. The prior embodiment performed the slicing operation at fixed time intervals and therefore disturbed the attenuator settings periodically at these fixed-time intervals. The reversible counters overflow eventually, even when each tap is set perfectly, but at relatively widely spaced time intervals. The "random walk" effect is greatly reduced when sequential estimation with reversible counters is employed instead of the fixed time estimation previously employed. In addition, less time on the average is required for a given accuracy to adjust a given tap with sequential estimation.

Clock pulses for advancing counters 32 are provided from clock 25 over lead 23; and for advancing shift register 30, over lead 26.

The implementation of the adaptive equalizer of this invention over the preset automatic equalizer disclosed in the aforesaid Becker et al. patent application, both of which employ a thirteen-tap delay line, involves one six-stage shift register, 13 EXCLUSIVE-OR gates, an extra stage on the detecting slicer and an error-polarity corrector. The adaptive equalizer provides accurate initial equalization and maintains it in the face of changing channel characteristics throughout message transmission.

For a practical equalizer with sixteen-level signal encoding at a symbol rate of 2400 per second, a binary rate of 9600 per second was achieved. Seven-stage counters 32 were used for statistical averaging and eight-stage counters 15 for attenuator adjustment. An attenuator one step out of alignment was corrected with a probable ninety-nine percent accuracy within one-half second.

While the present invention has been described with reference to a particular embodiment thereof, it is to be understood that additional embodiments and modifications which utilize its underlying principles will be obvious to those skilled in the art and are included within the scope of the following claims.

What is claimed is:

1. An adaptive equalizer for a transmission channel of limited bandwith comprising a transversal filter at the receiving end of said channel having a delay line portion with output taps at equally spaced intervals determined by the transmission rate of multilevel symbols traversing said channel, an incrementally adjustable attenuator connected to each such output tap and a summing circuit combing the attenuated outputs of all such taps, means sampling the output of said summing circuit at said symbol transmission rate, a multilevel slicer cooperating with said sampling means for decoding each sample into a multilevel binary code representative of the nearest of a plurality of discrete permissible encoding levels, An additional stage on said slicer generating a further code digit representative of the direction of the difference between the sample and the nearest encoding level as an error signal, means matching the polarities of a plurality of successive symbols derived from said slicer with that of said error signal and producing binary outputs accordingly, means counting the binary outputs from said matching means to produce appropriate incrementing signals for said attenuators whenever predetermined counts in one or the other direction are achieved.

2. The adaptive equalizer of claim 1 in which said multilevel signals are encoded in a reflective binary code and said multilevel slicer comprises a plurality of full-wave rectifiers in tandem with each other for successively folding and centering the output of said sampling means, the number of said rectifiers being one less than the number of digits in said code, and a plurality of zero-level slicing stages, one being in series with the output of said sampling means and each of the others in series with one of said rectifiers, the output of the one of said stages representing said symbol polarity, and the outputs of the other stages representing code digits of decreasing significance.

3. The adaptive equalizer of claim 2 in which said additional slicer stage comprises a further full-wave rectifier in tandem with the lowest order of said plurality of full-wave rectifiers, and a further slicing circuit in series with said further rectifier, the output of said further slicing circuit representing the apparent polarity of said error signal.

4. The adaptive equalizer of claim 3 and means summing modulo-two the outputs of said slicing stages to produce an output of one binary form if the summation is even and of the other binary form otherwise, and EXCLUSIVE-OR means combining the output of said further slicing circuit with that of said summing means as the corrected polarity of said error signal.

5. The adaptive equalizer of claim 1 in which said matching means comprise EXCLUSIVE-OR gates.

6. The adaptive equalizer of claim 1 in which said counting means comprise reversible binary counters resettable to a neutral count whenever said predetermined counts are achieved.

7. In combination with a receiver for $2^n$-level encoded data symbols including a transversal filter equalizer with incrementally adjustable attenuators at $m$ taps thereon, means for adaptively controlling settings for said attenuators during message reception comprising means slicing $n+1$ times and folding $n$ times the summation of signal components traversing the attenuators of said equalizer to decode successive data symbols, means for storing symbol polarity signals representing the polarity of $m$ successive data symbols derived from the first slice in said slicing means, means delaying an error polarity signal derived from the $n+1$ slice in said slicing means by $m-1/2$ symbol intervals, $m$ EXCLUSIVE-OR gates correlating said error polarity signals individually with symbol polarity signals in said storing means, $m$ reversible counters averaging the correlated outputs of said EXCLUSIVE-OR gates, and means responsive to preselected positive or negative counts in said $m$ reversible counters for incrementing said attenuators accordingly.

8. The combination of claim 7 in which said means for storing symbol polarity symbols comprises an $m$-stage binary shift register.

9. The combination of claim 7 in which said delaying means comprises a binary shift register having $m-1/2$ stages.

10. Apparatus for adaptively establishing optimum settings for the attenuators in a transversal equalizer from multilevel message data signals traversing a distorting transmission channel in tandem with said equalizer comprising means repeatedly determining the polarity of error signals from the direction of the difference between the actual level and the nearest encoding level of time-spaced analog samples of the output of said equalizer, means repeatedly generating symbol polarity signals from time-spaced samples of the output of said equalizer, means repeatedly comparing said error polarity signals with a succession of symbol polarity signals occurring with, before and after said error polarity symbols, means responsive to said comparing means counting the number of times said respective polarity signals agree and not agree up to predetermined maximum counts, and means responsive to overflow in either direction of said counting means adjusting said attenuators step-by-step in a direction opposite to the polarity which caused said counting means to reach said maximum counts.

11. In combination with a transmission channel of limited bandwidth and a transversal filter having a plurally tapped delay line, an incrementally adjustable attenuator in series with each tap and a common summing point, means continuously establishing settings for said attenuators adaptive to a random bipolar multilevel message signal sequence traversing said channel at a synchronous rate comprising means synchronously sampling the analog output at said summing point, means generating a symbol polarity signal from each analog sample, multilevel slicing means detecting an error polarity signal related to the direction of the difference between the actual amplitude of each analog sample and the nearest encoding level, means continuously storing a plurality of successive symbol polarity signals from said generating means, means delaying said error polarity signals by half the delay of said delay line, a plurality of EXCLUSIVE-OR circuits matching each delayed error polarity signal with the plurality of successive symbol polarity signals in said storing means and producing binary output signals indicative of such match or mismatch, means counting the respective binary outputs of each of said EXCLUSIVE-OR circuits and producing overflow signals whenever predetermined counts are exceeded in either direction, and means responsive to the direction of the overflow signals in said counting means for incrementally adjusting said attenuators.

12. In combination:

an attenuator responsive to a control signal for attenuating a multilevel data signal applied thereto to provide an attenuated multilevel data signal; and means responsive to the difference between said attenuated multilevel data signal and the nearest of a plurality of discrete permissible encoding levels for providing said control signal.

13. A combination as defined in claim 12 comprising:

a multilevel slicer for decoding said attenuated multilevel data signal to provide a decoded signal representative of the nearest of the plurality of discrete permissible encoding levels; and wherein said difference responsive means includes an additional stage on said multilevel slicer.

References Cited

UNITED STATES PATENTS

| | | | |
|---|---|---|---|
| 3,292,110 | 12/1966 | Becker et al. ------ | 178—69 X |
| 3,308,431 | 3/1967 | Hopner et al. ----- | 325—42 X |

ROBERT L. GRIFFIN, *Primary Examiner.*

J. T. STRATMAN, *Assistant Examiner.*